(12) United States Patent
Yebka et al.

(10) Patent No.: US 9,252,617 B2
(45) Date of Patent: Feb. 2, 2016

(54) BATTERY CYCLING AND MANAGEMENT

(71) Applicant: Lenovo (Singapore) Pte. Ltd., Singapore (SG)

(72) Inventors: Bouziane Yebka, Apex, NC (US); Jeremy Robert Carlson, Cary, NC (US); Larry Glenn Estes, Durham, NC (US); Philip John Jakes, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 524 days.

(21) Appl. No.: 13/716,413

(22) Filed: Dec. 17, 2012

(65) Prior Publication Data

US 2014/0167699 A1 Jun. 19, 2014

(51) Int. Cl.
*H01M 10/44* (2006.01)
*H01M 10/46* (2006.01)
*H02J 7/00* (2006.01)

(52) U.S. Cl.
CPC ....... *H02J 7/0063* (2013.01); *H02J 2007/0067* (2013.01)

(58) Field of Classification Search
CPC ..... H02J 7/0013; H02J 7/0016; H02J 7/0021; H02J 7/0026; H02J 7/0047; H02J 2007/005

USPC .......... 320/107, 112, 116, 118, 130, 132, 149
See application file for complete search history.

(56) References Cited

U.S. PATENT DOCUMENTS

2012/0133333 A1* 5/2012 Morioka et al. .............. 320/134

FOREIGN PATENT DOCUMENTS

JP  2003256083 A  9/2003
JP  3976268 B2  6/2007

* cited by examiner

*Primary Examiner* — Edward Tso
(74) *Attorney, Agent, or Firm* — Ference & Associates LLC

(57) ABSTRACT

An aspect provides a method, including: setting a battery pack, in an information handling device having two or more battery packs, as a priority battery pack; discharging the priority battery pack and maintaining one or more other battery packs in an idle state; ascertaining if the priority battery pack satisfies one or more conditions; and in response to the priority battery pack satisfying the one or more conditions, setting one of the one or more other battery packs to be the priority battery pack and maintaining the remaining battery packs in an idle state; wherein the priority battery pack is prioritized in terms of charging. Other aspects are described and claimed.

22 Claims, 16 Drawing Sheets

| Scenarios | Pack A | | Pack B | |
|---|---|---|---|---|
| | Embedded | Replaceable | Embedded | Replaceable |
| 1 | ☑ | | ☑ | |
| 2 | ☑ | | | |
| 3 | | ☑ | ☑ | |
| 4 | | ☑ | | ☑ |

Pack A: First Priority Discharge
Pack B: Second Priority Discharge

FIG. 3

BATTERY CYCLING AND MANAGEMENT

BACKGROUND

Information handling devices ("devices"), for example laptop computers, tablet computing devices, smart phones, e-readers, mp3 players and the like, use rechargeable battery packs to supply power. For example, devices commonly include a rechargeable battery pack that is charged by a commercial power source (wall outlet) and powers the device when disconnected therefrom.

Increased operational battery life (i.e., useful operating time between charges) and increased overall battery life (i.e., time the battery remains useful and rechargeable) are desirable. Many advances have been made in this area. One approach is to provide additional battery packs such that a device may use one or a plurality of available battery packs (e.g., one battery pack used first, followed by a second battery pack). This permits devices to increase the operational battery life (i.e., extend time between charging) and provides other advantages.

BRIEF SUMMARY

In summary, one aspect provides a method, comprising: setting a battery pack, in an information handling device having two or more battery packs, as a priority battery pack; discharging the priority battery pack and maintaining one or more other battery packs in an idle state; ascertaining if the priority battery pack satisfies one or more conditions; and in response to the priority battery pack satisfying the one or more conditions, setting one of the one or more other battery packs to be the priority battery pack and maintaining the remaining battery packs in an idle state; wherein the priority battery pack is prioritized in terms of charging.

Another aspect provides an information handling device, comprising: two or more battery packs; one or more processors; and a memory operatively coupled to the one or more processors that stores instructions executable by the one or more processors to perform acts comprising: setting a battery pack of the two or more battery packs as a priority battery pack; discharging the priority battery pack and maintaining one or more other battery packs in an idle state; ascertaining if the priority battery pack satisfies one or more conditions; and in response to the priority battery pack satisfying the one or more conditions, setting one of the one or more other battery packs to be the priority battery pack and maintaining the remaining battery packs in an idle state; wherein the priority battery pack is prioritized in terms of charging.

A further aspect provides a program product, comprising: a storage medium having computer program code embodied therewith, the computer program code comprising: computer program code configured to set a battery pack, in an information handling device having two or more battery packs, as a priority battery pack; computer program code configured to discharge the priority battery pack and maintain one or more other battery packs in an idle state; computer program code configured to ascertain if the priority battery pack satisfies one or more conditions; and computer program code configured to, in response to the priority battery pack satisfying the one or more conditions, set one of the one or more other battery packs to be the priority battery pack and maintain the remaining battery packs in an idle state; wherein the priority battery pack is prioritized in terms of charging.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates example scenarios for a device having multiple battery packs.

DETAILED DESCRIPTION

Figure 1:
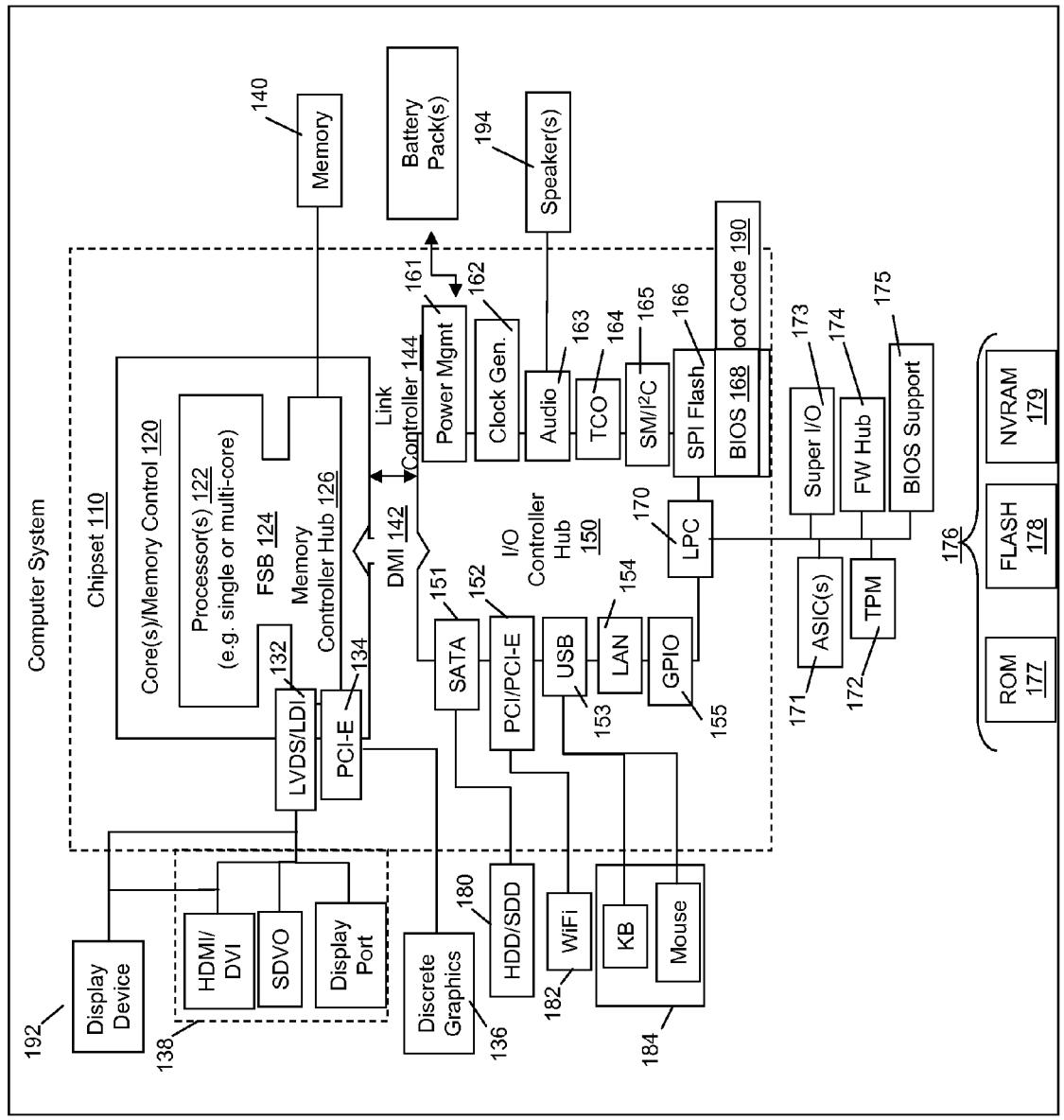
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices incorporating multiple battery packs are useful because they extend the operational life of the battery (due to increased power storage capability) and may be useful in extending overall battery life (due to the load sharing capability of more than one battery pack). However, intelligent management schemes for cycling multiple battery pack devices have not conventionally been employed.

Accordingly, an embodiment provides for battery cycling and management when more than one battery pack is available to the device. By intelligently employing the battery packs, embodiments extend the overall life of the battery packs, leading to extended useful life of mobile devices and reduced cost, as well as providing for extended operational battery life.

In an embodiment, a battery pack is prioritized and remaining battery packs are placed in idle state. A prioritized battery pack is prioritized in terms of charging (first to be charged). A battery pack in an idle state is one which is not prioritized, and will not be charged first. A battery pack in idle state may discharge, e.g., when a prioritized battery pack is used until it reaches a reduced capacity and a switch is made to discharge a battery pack in the idle state. On a subsequent charge, the prioritized battery pack will be charged first.

A battery pack in an idle state may be stored at a full charge (or substantially full charge) or may be stored at a reduced charge (e.g., a fractional charge). For example, for longer time periods in an idle state, a battery pack thus maintained may be stored at a reduced charge.

The term battery pack(s) (or simply "pack(s)"), as used herein, is defined to mean a rechargeable power unit that may operate independently to power a load, for example provide power for an information handling device. A battery pack may include one or more battery cells. Thus, a multi-pack information handling device is an information handling device with more than one battery pack, where the device may operate using one of the battery packs at a given time. An example of such a multi-pack device includes a tablet or notebook computer with one embedded battery pack and one removable/replaceable battery pack. Other types of devices and battery packs may be employed, as will become clear from the following description of example embodiments.

The illustrated example embodiments will be best understood by reference to the figures. The following description is intended only by way of example, and simply illustrates certain example embodiments.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a LVDS interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, which may control power units such as battery pack(s), a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1, may include battery packs that are integral or removable/replaceable, or both. The battery packs supply power to system components for executing various tasks. The battery packs are rechargeable and afford mobility to the unit (i.e., provide for operation when the device is not connected to the power source). An embodiment provides power management capabilities for cycling the battery packs in an intelligent fashion such that a useful condition is maximized. In one example, the useful condition is extending overall battery life of the battery packs.

Figure 2:
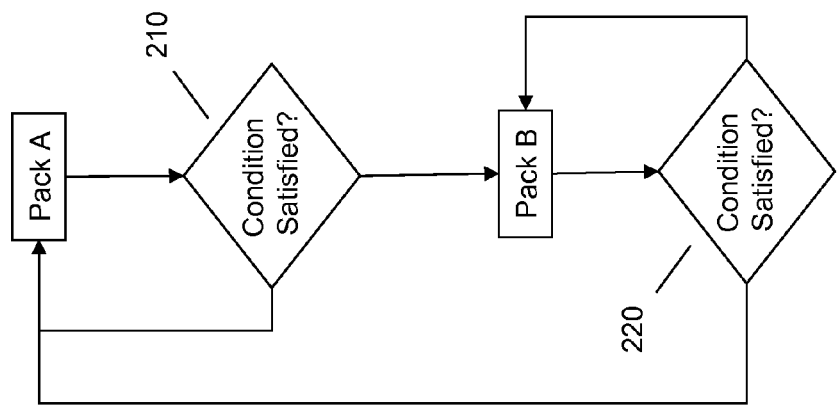
FIG. 2 illustrates an example method of battery cycling and management.

Referring to FIG. 2, illustrated is an example of cycling battery packs responsive to one or more determined conditions. The method may be carried out by computer program code (instructions) stored in memory and executed by a processor. The code and/or processor may be that of the main system or may be that of a sub-component, such as a battery pack including processing and code storage capabilities. A combination of the foregoing may be used as well.

In a device such as illustrated in FIG. 1, the device may include a two battery packs ("Pack A", "Pack B"). The packs may be used to power the device differentially. Initially, one of the packs will be prioritized for use, e.g., "Pack A". Thus the system will operate under power supplied from Pack A. At 210, a check is made to determine if one or more conditions regarding Pack A are satisfied. The conditions are switching conditions, i.e., condition(s) triggering a switch in prioritization.

An embodiment may allow an idle battery pack to discharge without switching priority. For example, with battery packs in a charged state, the priority battery pack will be discharged first until a minimum state of charge is reached in that pack, then the system will switch and begin discharging the idle battery pack, without switching priority. The system will then charge the priority battery pack first until a state of charge threshold is met, then switch to the idle battery pack to charge. Additionally or alternatively, an embodiment may treat the switch to discharging an idle pack as a condition for switching priority, with a switch to prioritizing the discharging idle pack.

The conditions may include but are not limited to number of cycles (e.g., the number of cycles Pack A has been the priority pack in total, the number of cycles Pack A has been the priority pack in a row, the number of cycles Pack A has been the priority pack in a given time frame, etc.), time (e.g., the time Pack A has been the priority pack, the age of Pack A, etc.), and the capacity (e.g., the remaining capacity of Pack A as compared to a starting capacity, an estimated capacity (e.g., estimated full charge capacity), a relative capacity of Pack A compared to other packs, e.g., Pack B, etc.). Thus, the condition(s) trigger a switch to another battery pack if satisfied. The condition(s) is/are satisfied if the condition is met, e.g., a predetermined number of cycles have accrued, a predetermined time has passed, a predetermined capacity is remaining, etc. The conditions may be used alone or in a suitable combination. As an example, an embodiment may first check a time condition, followed by a cycle condition, followed by a capacity condition; wherein if a battery pack satisfies all conditions, a switch is made.

If one or more conditions are not satisfied at 210, the device continues to operate under power supplied by Pack A and Pack A cycling is continued. That is, if one or more conditions are not satisfied, Pack A continues to charge/discharge, and Pack B remains in an idle state (e.g., a reduced charge state).

However, if one or more conditions are satisfied at 210, the device is switched to operate from power supplied by Pack B, and Pack B cycling is initiated. Pack A may then be maintained in an idle state (e.g., reduced charge state). While operating Pack B (charging/discharging), an embodiment may likewise monitor Pack B to determine if one or more conditions are satisfied at 220. The conditions monitored may be the same as monitored at 210, or may be different. Responsive to one or more conditions being satisfied at 220, the device may switch to another battery pack, here Pack A (in a two-pack scenario).

More than two packs may be utilized in this fashion. FIG. 3 illustrates a table with various multi-pack scenarios. In scenario 1, two battery packs (Pack A and Pack B) are provided, with each being embedded. In scenarios 2-3, one pack is embedded and one pack is replaceable. In scenario 4, each pack is replaceable. The nature of the pack (i.e., embedded or replaceable) may influence the cycling implementation chosen. For example, in a scenario where one pack is embedded and one pack is replaceable, the cycling may be biased to put more cycles on the replaceable pack given that it may be swapped out if it fails or degrades.

A variety of cycling scenarios may be employed. The cycling implemented may permit increased overall battery life by reducing the cycling load on a given battery pack (e.g., via switching between packs), and the life of each battery pack may be extended by switching intelligently between the packs in various ways. Various example cycling implementations are now described.

FIG. 4 through FIG. 8 provide graphic examples of cycling management between two packs (A and B). These are non-limiting examples.

Figure 4:
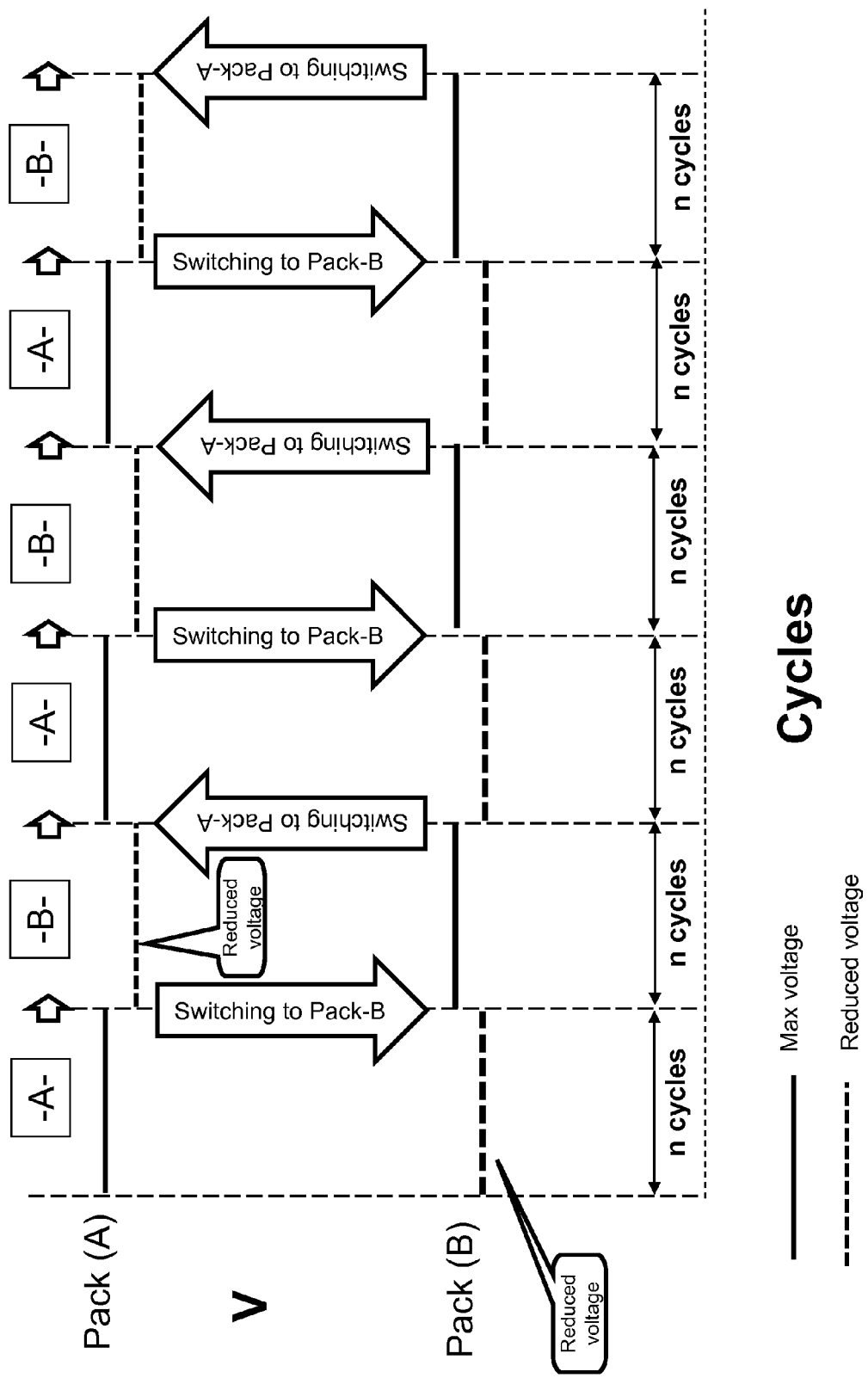
FIG. 4 illustrates an example of battery cycling using multiple packs in a device.

In FIG. 4, Pack A is initially maximally charged (or charged to a predetermined usage amount) and is used for n cycles to power the device, such as a device outlined in FIG. 1. The "n" in "n cycles" may be chosen and modified as desired, for example based on battery pack characteristic(s). The "n" in "n cycles" may be one cycle or more than one cycle. At the termination of the $n^{th}$ cycle (e.g., a condition determined at 210 of FIG. 2), a switch is made in priority, and Pack B becomes the priority pack (i.e., Pack B is cycled for n cycles). While Pack A is the priority pack, Pack B is charged at a reduced voltage in an idle state. The reduced voltage for the idle state may be chosen for example on the basis of a voltage known to provide suitable stability to the battery while not in use (i.e., while not being cycled). Similarly, while Pack B is the priority pack (is being cycled), Pack A may be stored at a reduced voltage.

Figure 5:
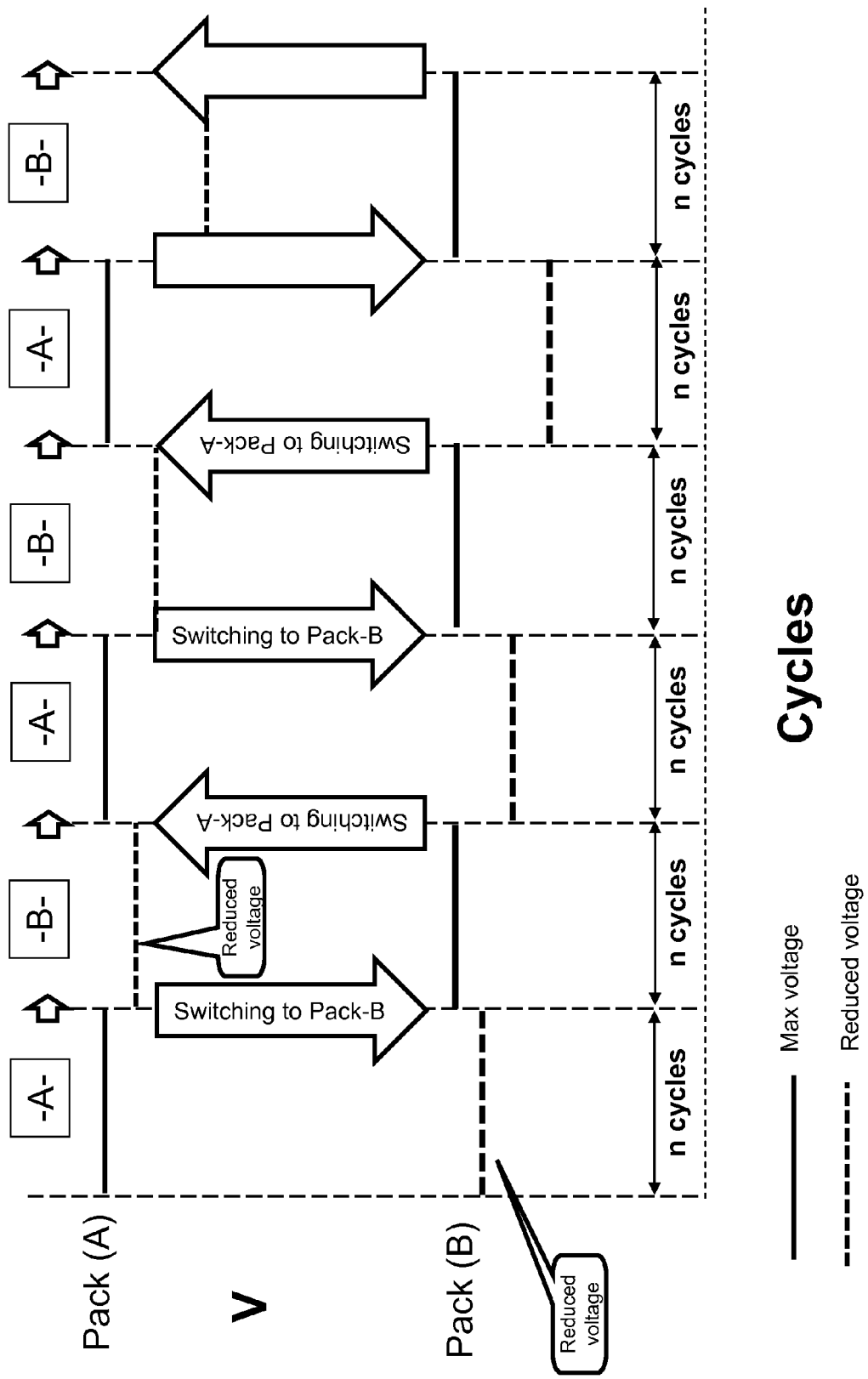
FIG. 5 illustrates an example of battery cycling using multiple packs in a device.

As illustrated in FIG. 5, each pack may be stored in the idle state using decreasing idle state voltages. That is, in a first idle state, the pack will be charged at a first idle state voltage, whereas in the second idle state, the pack will be charged at a second idle state voltage, where the first idle state voltage is greater than the second idle state voltage.

Figure 6:
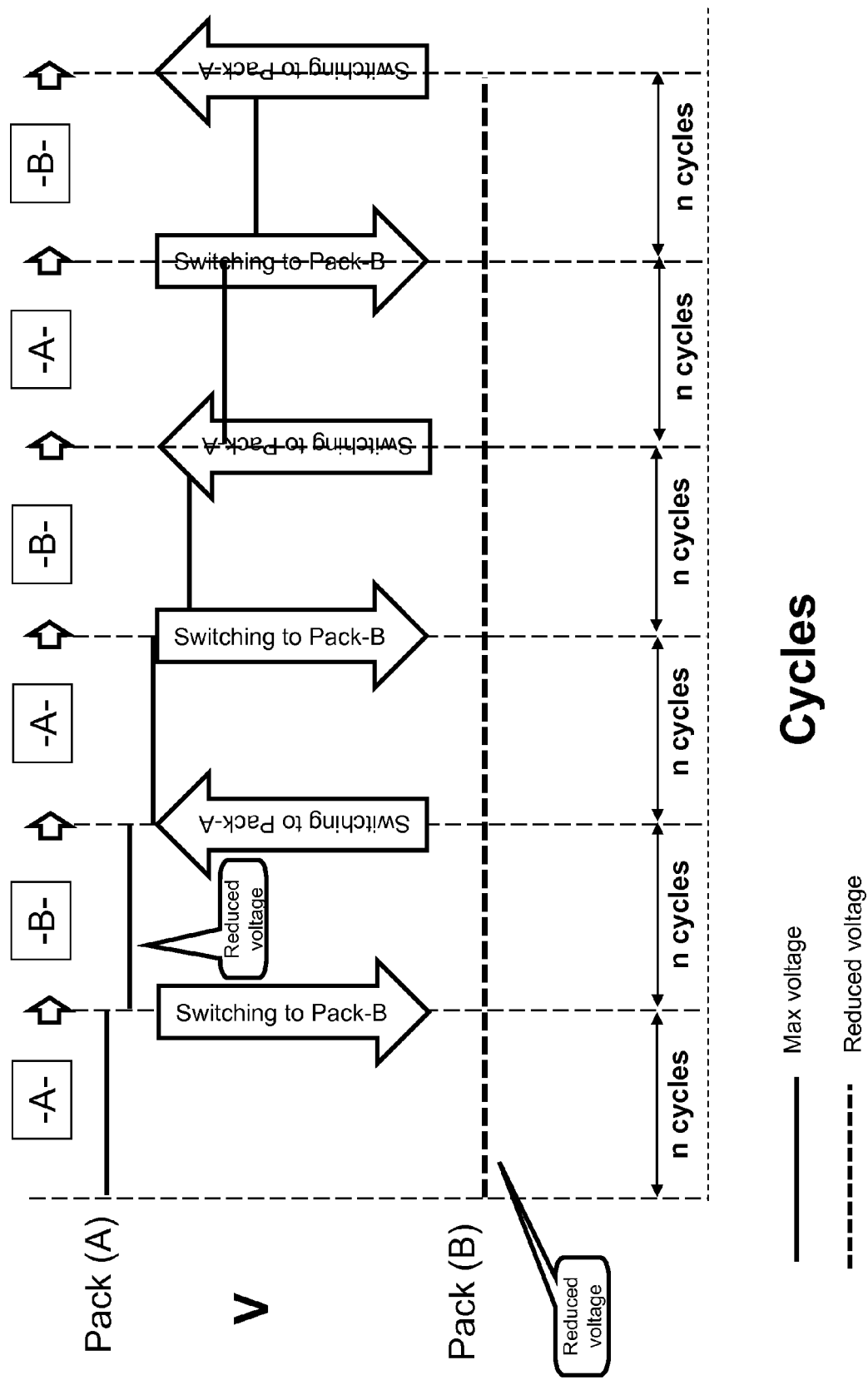
FIG. 6 illustrates an example of battery cycling using multiple packs in a device.
Figure 7:
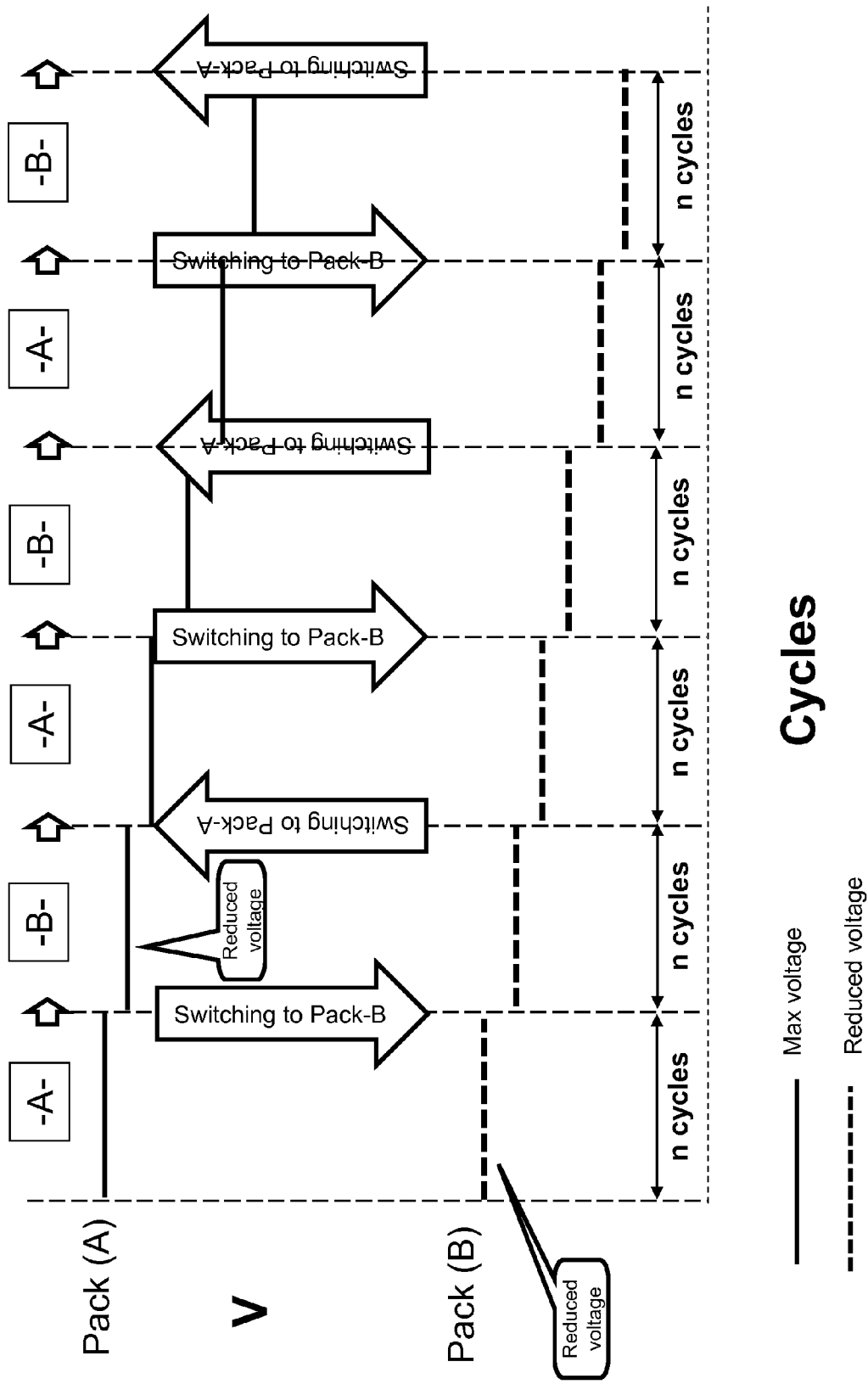
FIG. 7 illustrates an example of battery cycling using multiple packs in a device.

FIG. 6 illustrates a scenario in which a given pack (here, Pack A) is prioritized and repeatedly cycled while the other pack(s) (here, Pack B) are reduced in priority and maintained at an idle voltage for a given number of cycles (e.g., until a switch). The cycling pack (Pack A), may be gradually stepped down in charged voltage (e.g., its maximum voltage may be reduced), for example in response to completing n charging cycles. The cycling of FIG. 6 may be implemented along with another cycling routine, e.g., that of FIG. 4 or FIG. 5 (including switching between priority packs). The gradual stepping down of voltage may be applied to the idle state voltage as well, as illustrated in FIG. 7.

Figure 8:
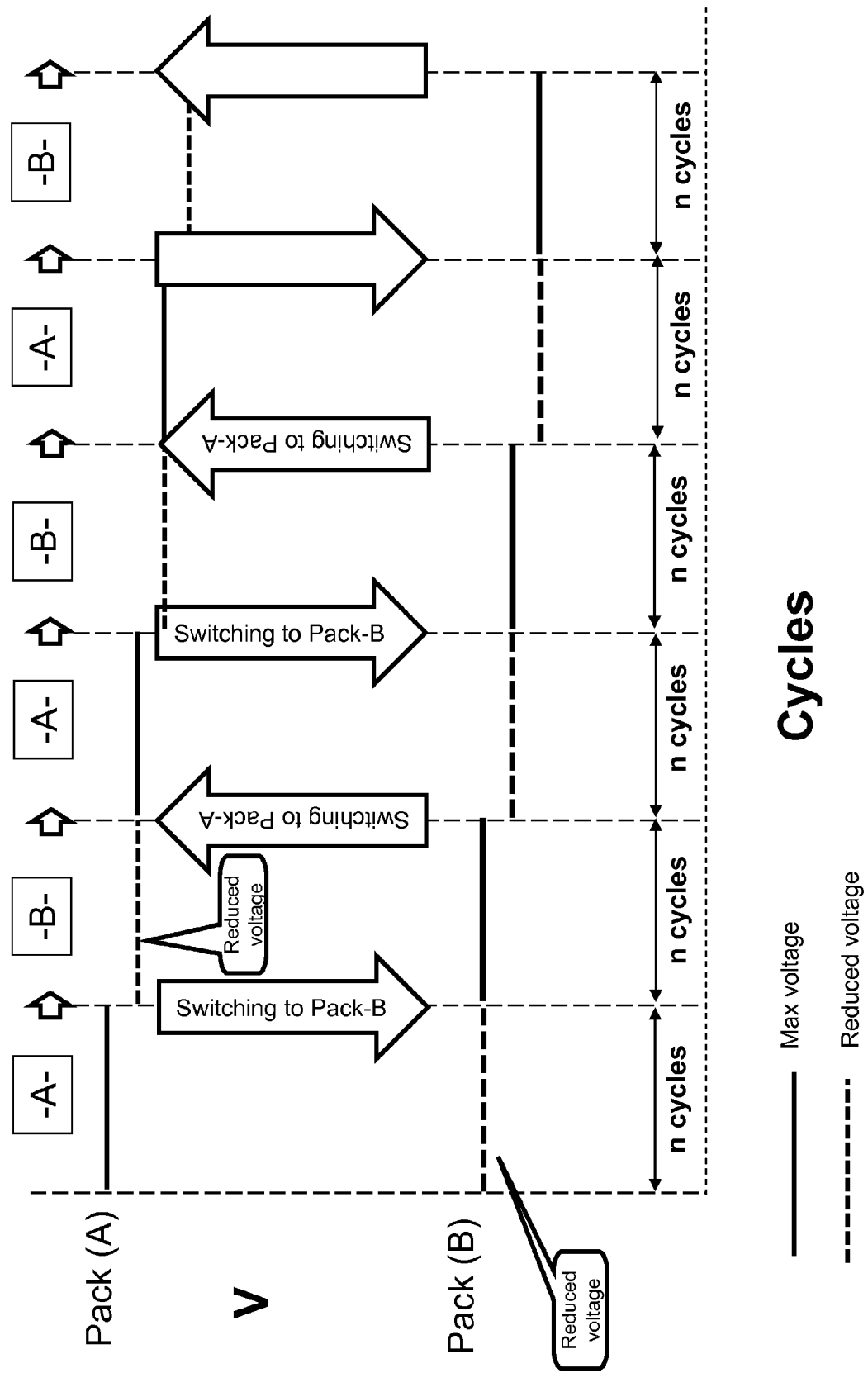
FIG. 8 illustrates an example of battery cycling using multiple packs in a device.

Stepping down of voltages may be applied in various ways, for example as illustrated in FIG. 8, where the priority state and idle state voltages are stepped down sequentially following pack switching operations. Thus, as illustrated in FIG. 8, each pack will have its idle state voltage stepped down following its use as a priority (cycling) pack.

Figure 9:
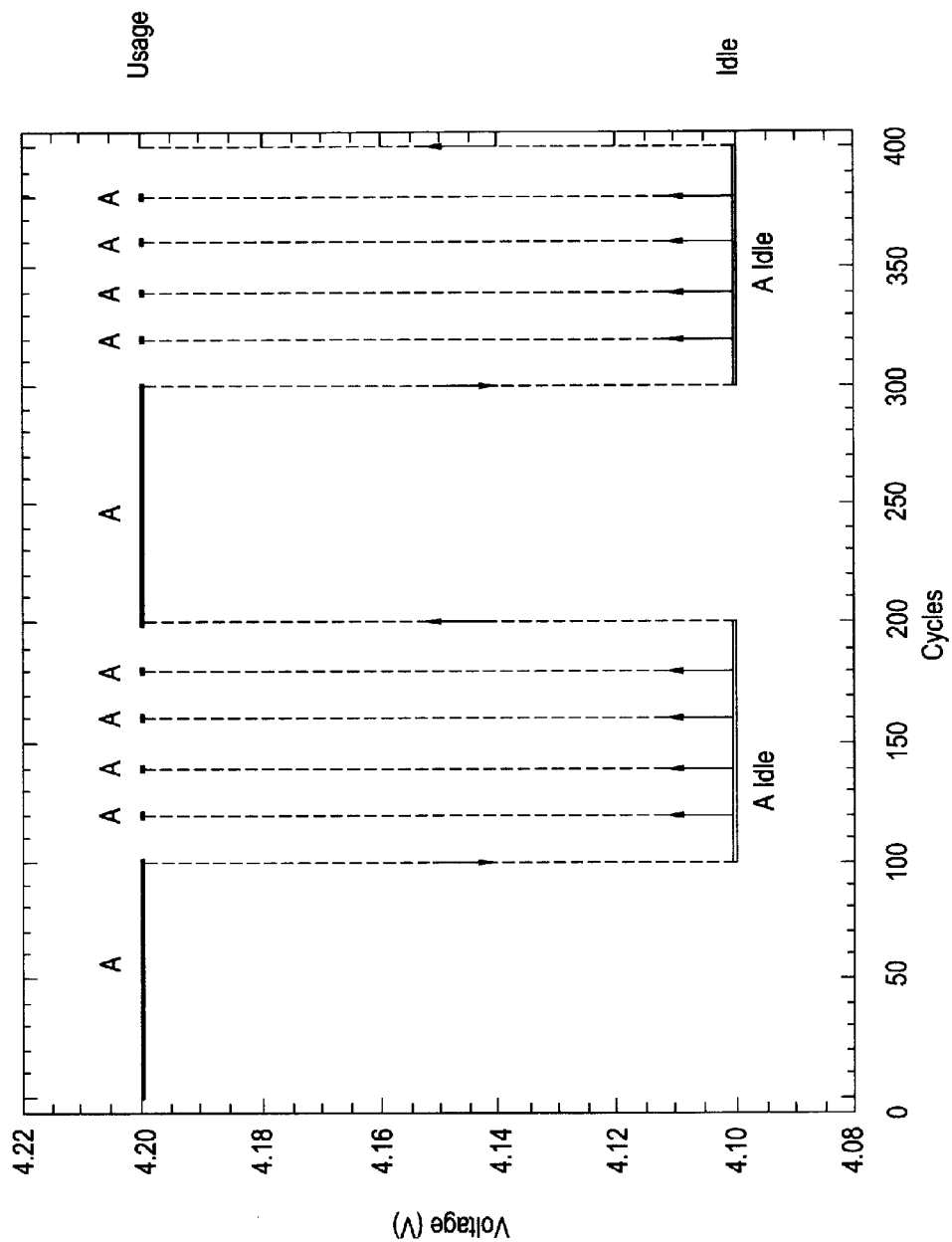
FIG. 9 illustrates an example of battery cycling during idle time for a battery pack.

While packs may be reduced in priority and thus be placed in an idle state, it may be advantageous to intermittently cycle them. Doing so permits the pack to complete a charge/discharge cycle and thereby reduces any potential damage to the pack that may result from a long idle state. FIG. 9 illustrates an example of such a cycling implementation wherein a pack (Pack A), although in idle state, is prioritized and permitted to cycle intermittently (e.g., once every 20 cycles). Thus, Pack B will be the priority pack for a given stage, with Pack A in idle state, but Pack A will be cycled once per 20 cycles. The length of the idle state, the frequency of intermittent cycling, and the number of intermittent cycles (e.g., one versus two intermittent cycles, etc.) may be modified as desired, for example based on battery pack characteristics.

Figure 10A:
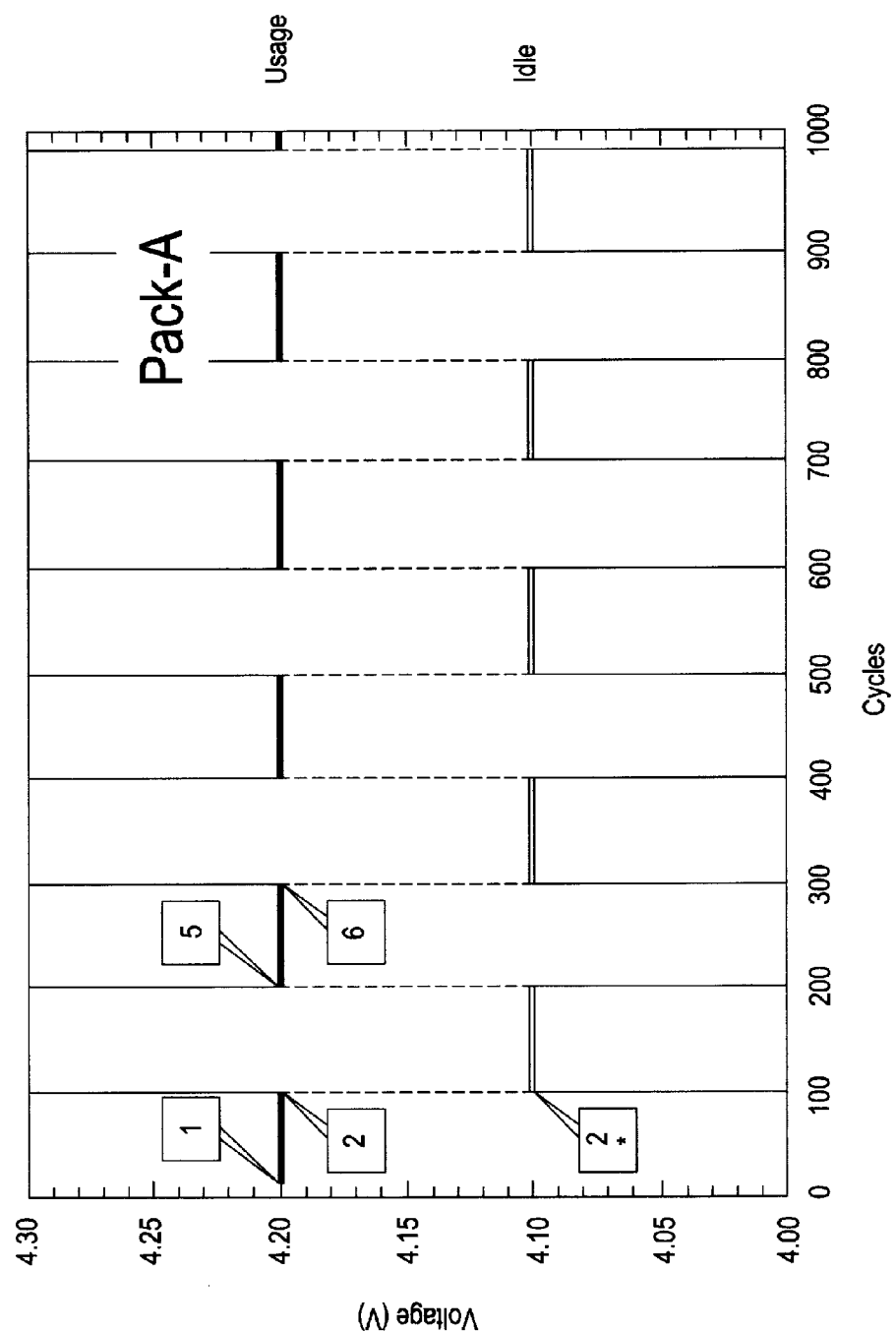
FIG. 10(A-B) illustrates an example of battery cycling using multiple packs in a device.
Figure 10B:
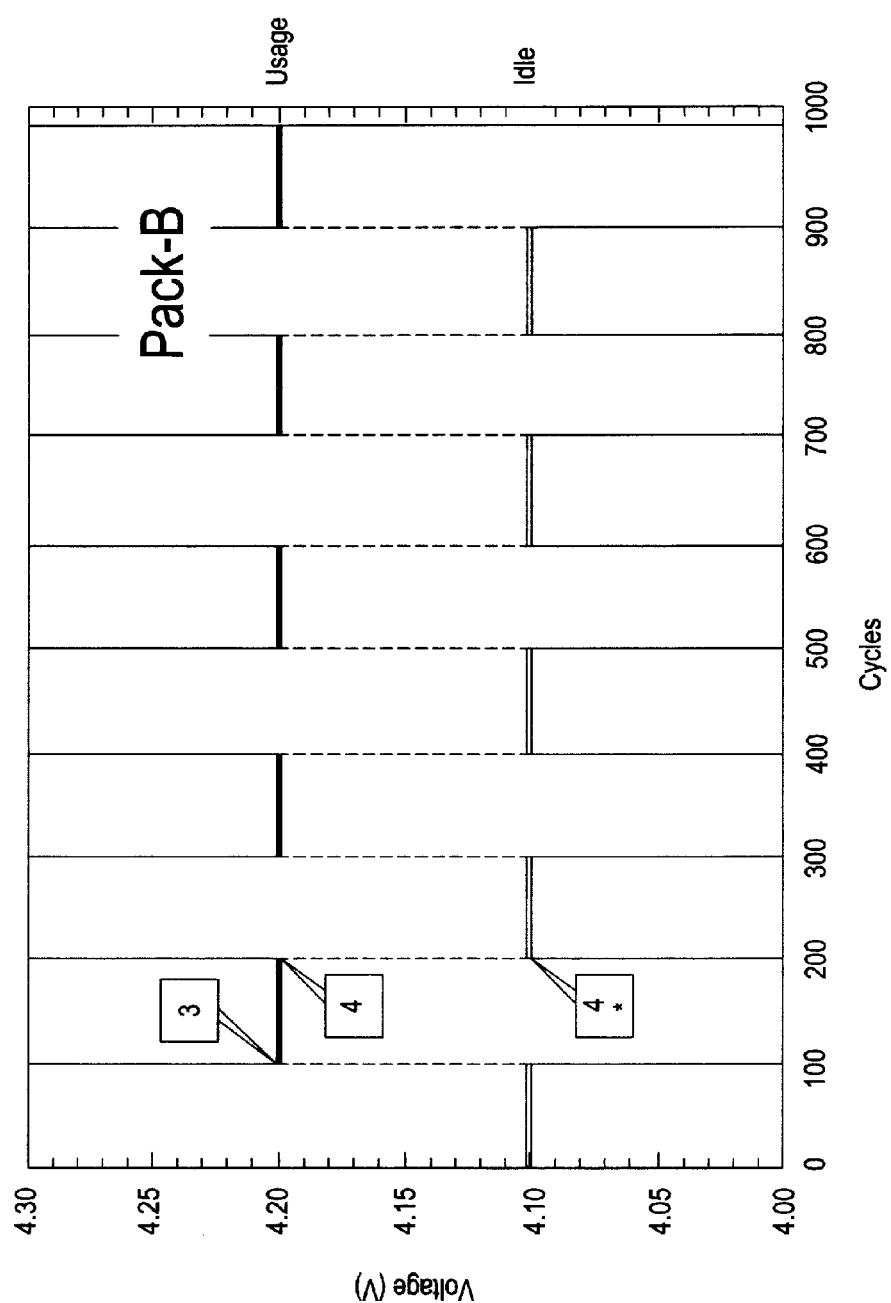

FIG. 10(A-B) provides a specific example of a cycling implementation using two packs, Pack A and Pack B. In FIG. 10A, Pack A is prioritized (step 1) and cycles for the first 100 charge/discharge cycles. At step 2, Pack A is placed into idle state (2\*). Pack B is prioritized (step 3, FIG. 10B) and cycles for the next 100 charge/discharge cycles until at step 4, Pack B is placed in idle state (4\*). Pack A is again prioritized (step 5) and operates for the next 100 charge/discharge cycles until it is again placed in idle state with Pack B prioritized (step 6). This cycling may continue unmodified or the cycling may be dynamically modified (e.g., implementation of stepped voltages (either charge voltages or idle voltages)), as described herein.

Figure 11A:
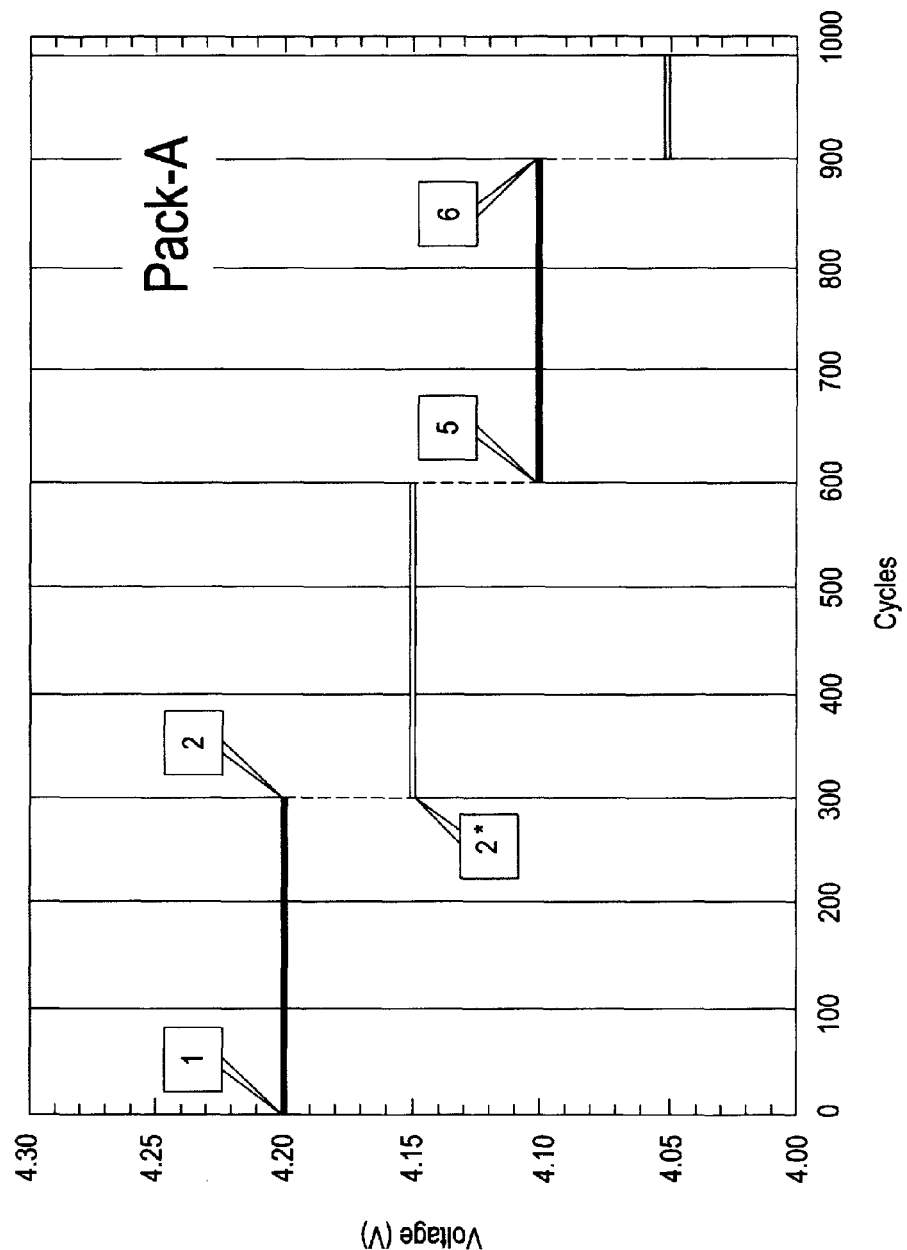
FIG. 11(A-B) illustrates an example of battery cycling using multiple packs in a device.
Figure 11B:
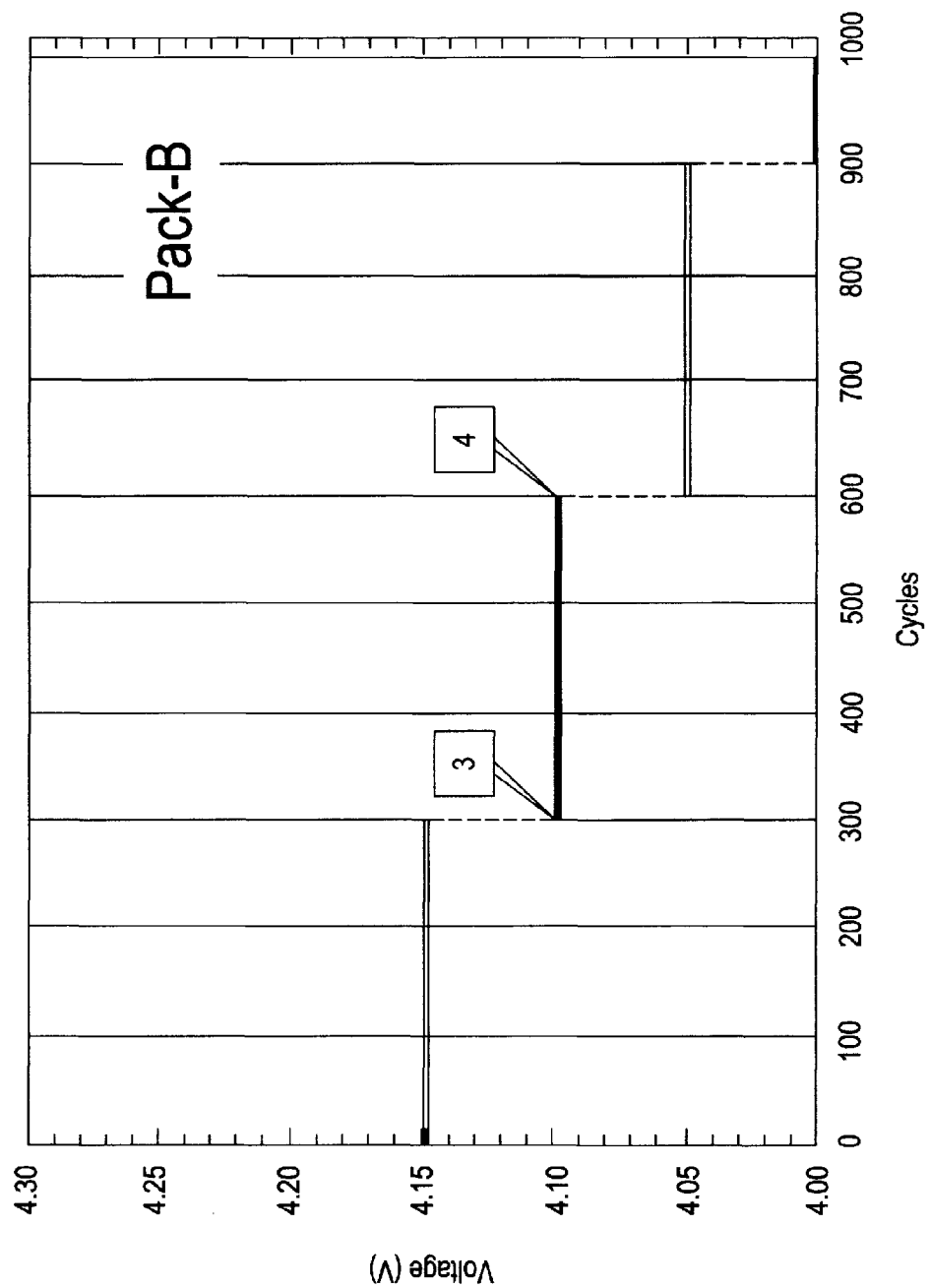

Similarly, the number of cycles used for a given pack may be modified as well as modifying the voltages, as illustrated in FIG. 11 (A-B). Thus, in FIG. 11A, Pack A is charged to 4.2 V (step 1) and cycles for the first 300 charge/discharge cycles until it is switched into the idle state (step 2), placing it in a reduced voltage (2*) where it does not cycle. Pack B is then the priority pack, step 3 (FIG. 11B), although it is charged only to a maximal voltage of 4.1 V and cycles for the next 300 cycles until it is placed in the idle state (step 4). Referring back to FIG. 11A, in step 5 Pack A is again prioritized and cycles for 300 cycles, although it is now charged only to 4.1V. At step 6, Pack A again is placed into an idle state and Pack B is prioritized.

Figure 12:
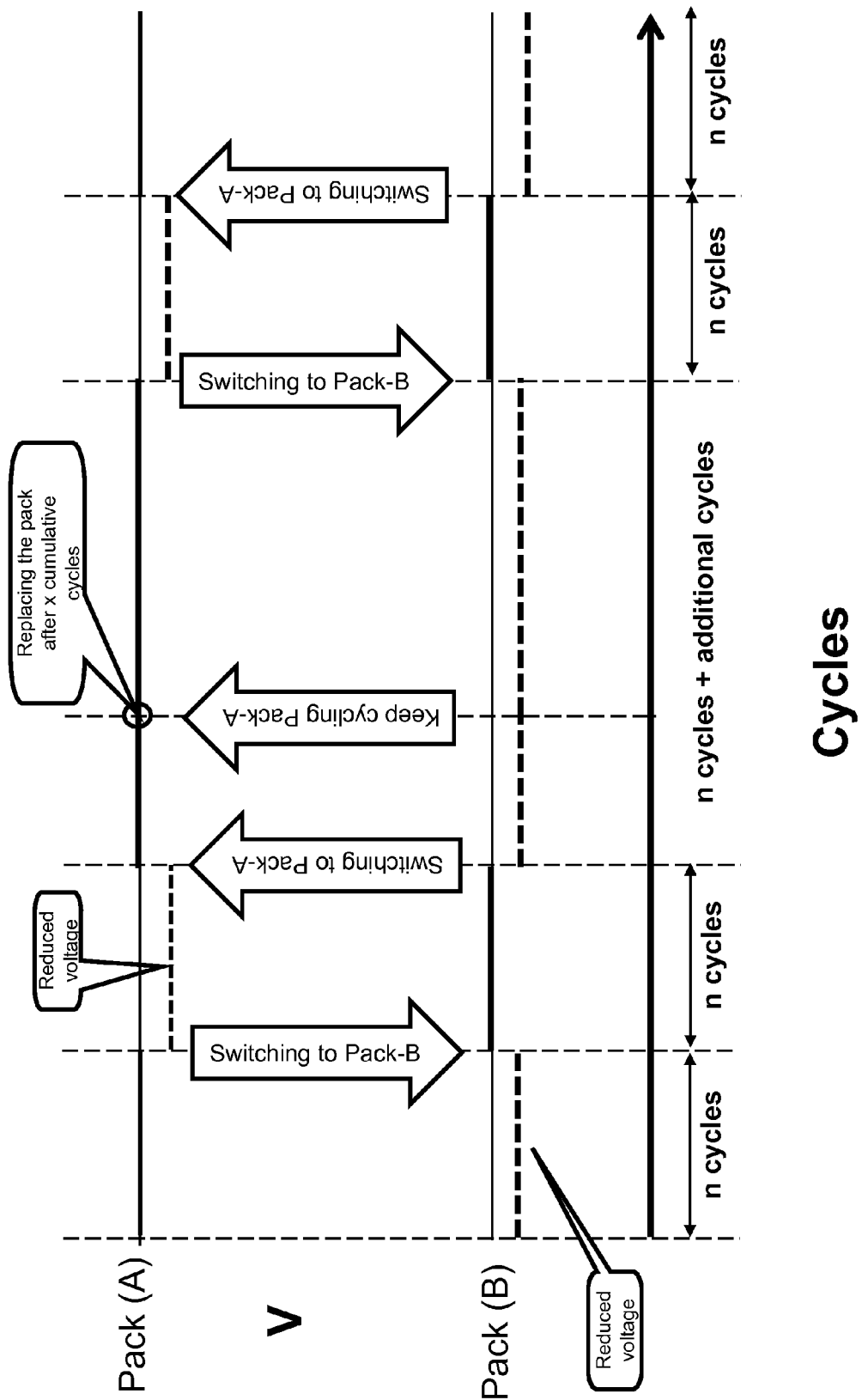
FIG. 12 illustrates an example of battery cycling using multiple packs in a device in a pack swap scenario.

As described herein, an embodiment provides for dynamically adjusting the cycling implementation chosen. One such scenario where this may be beneficial is illustrated in FIG. 12. In FIG. 12, after Pack A and Pack B have both been through a priority (usage) and idle state for n cycles, a pack switch occurs, e.g., a new pack is put in for Pack A (e.g., Pack A is replaceable). Responsive to the pack switch or swap, an embodiment keeps new Pack A in operation for n+ additional cycles (which may be modified) in order to the new Pack A to be "caught up" in terms of cycle usage. This may be followed by returning to an initial cycling implementation routine.

Figure 13:
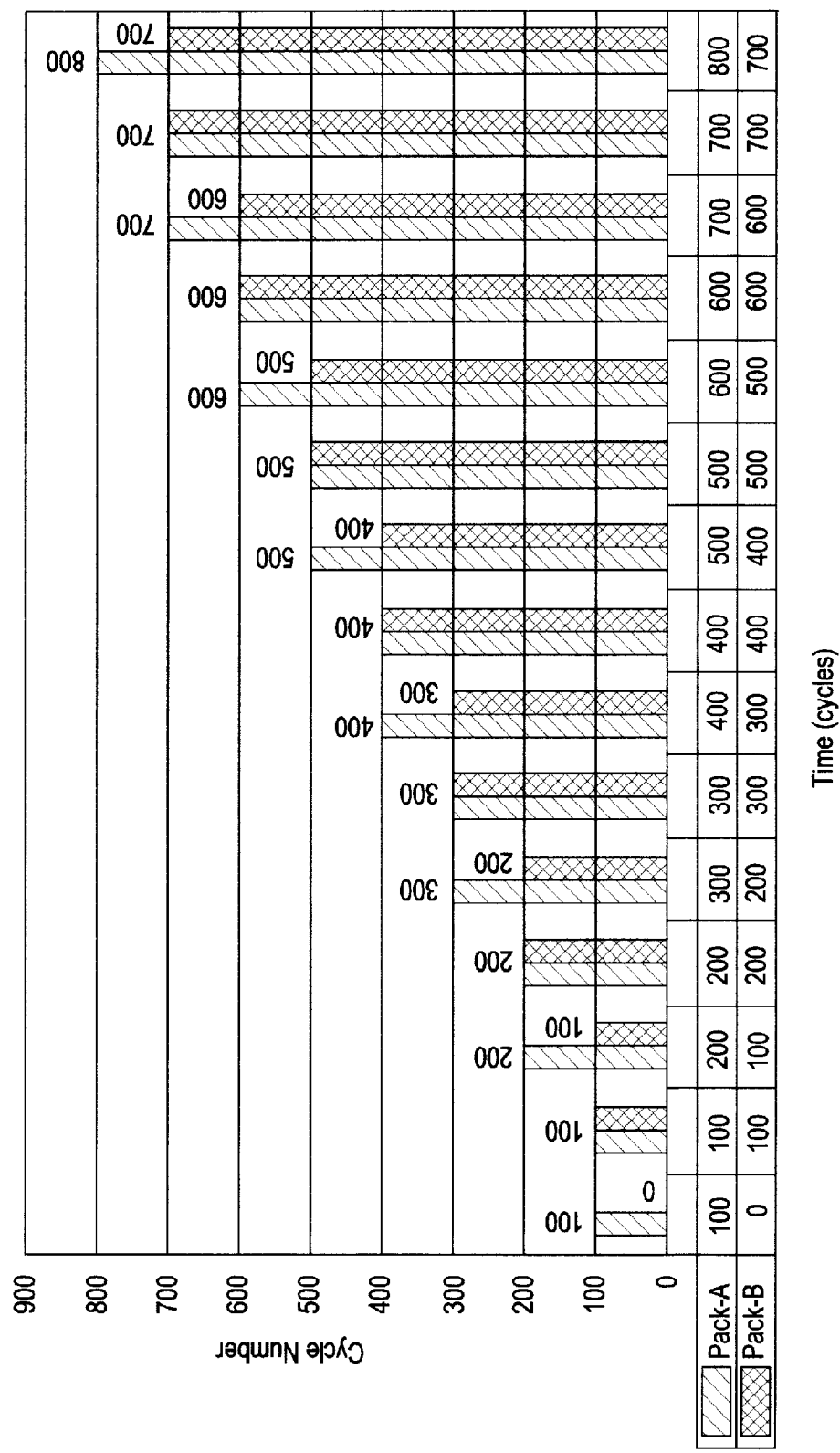
FIG. 13 illustrates an example of cycle numbers over the course of battery pack life for two battery packs.

FIG. 13 illustrates the cycle number for two packs (Pack A and Pack B) over the course of time. As illustrated, according to an embodiment, the packs are cycled such that each pack is used for an (approximately) equivalent number of cycles. This balances the work load between the packs and extends the overall battery life of the system.

Figure 14:
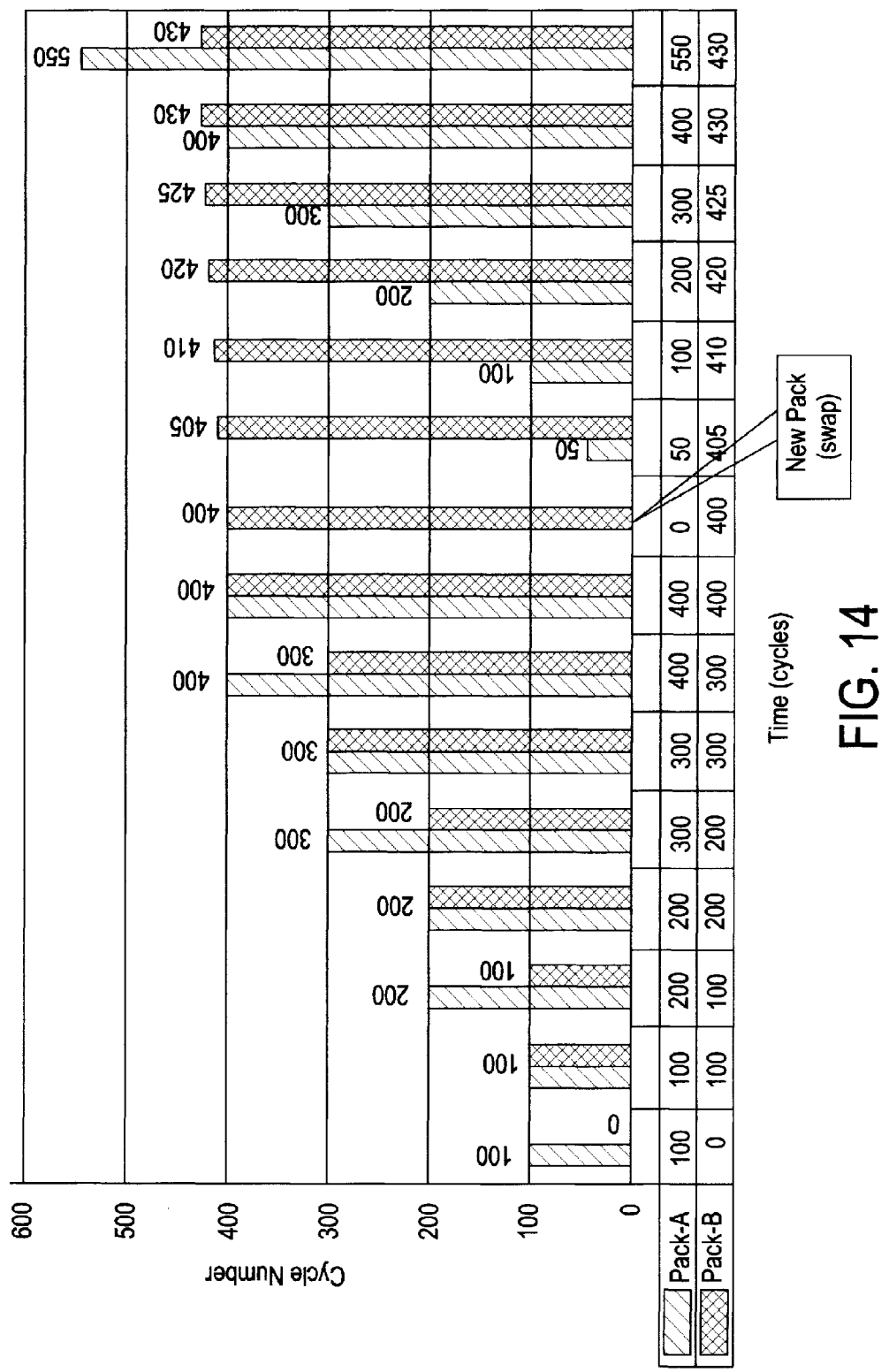
FIG. 14 illustrates an example of cycle numbers over the course of battery pack life for three battery packs.

A cycle count for an example cycling routing in the case of a pack swap or switch is illustrated in FIG. 14. As described herein, when a new pack is installed, (here, a new Pack A), it may be used preferentially to catch it up (in terms of cycle numbers) to the other existing packs (here, Pack B). Thus, on addition of a new Pack A, new Pack A is used for 50 cycles to Pack B's 5 cycles, for 5 change cycles, to put 400 cycles on new Pack A and put 430 total cycles on Pack B. New Pack A may then be used more (e.g., adding 150 cycles before the next switch) to place more cycles on the new pack (in terms of age) relative to the older pack (in terms of age). Other "catch up" routines may be utilized to achieve similar aims given the specific packs involved.

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof. As described herein, the battery packs themselves may be implemented with logic and processing capabilities to implement or participate in switching decisions, monitoring of conditions, etc.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, R F, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   setting a battery pack, in an information handling device having two or more battery packs, as a priority battery pack;
   charging and discharging the priority battery pack and maintaining one or more other battery packs in an idle state;
   ascertaining if the priority battery pack satisfies one or more conditions; and
   in response to the priority battery pack satisfying the one or more conditions, setting one of the one or more other battery packs to be the priority battery pack and maintaining the remaining battery packs in an idle state;
   wherein the priority battery pack is prioritized in terms of charging and discharging.

2. The method of claim 1, wherein the one or more conditions comprise charging/discharging for a predetermined number of cycles.

3. The method of claim 1, wherein the one or more conditions comprise a predetermined time as a priority battery pack.

4. The method of claim 1, wherein the one or more conditions comprise a remaining capacity of a currently prioritized battery pack.

5. The method of claim 1, wherein the one or more conditions comprise a capacity of a currently prioritized battery pack.

6. The method of claim 1, further comprising:
   during the charging and discharging of the priority battery pack and maintaining one or more other battery packs in an idle state, intermittently using one of the one or more other battery packs.

7. The method of claim 6, wherein intermittently using one of the one or more other battery packs comprises charging and discharging one of the one or more other battery packs about once per twenty charge/discharge cycles.

8. The method of claim 1, further comprising determining that one of the two or more battery packs has been newly installed.

9. The method of claim 8, further comprising setting the newly installed battery pack to be the priority battery pack for a predetermined period.

10. The method of claim 9, wherein the predetermined period comprises a predetermined number of cycles.

11. The method of claim 10, wherein the predetermined number of cycles is dynamically modified to level the newly installed battery pack with one or more other battery packs.

12. An information handling device, comprising:
   two or more battery packs;
   one or more processors; and
   a memory operatively coupled to the one or more processors that stores instructions executable by the one or more processors to perform acts comprising:
   setting a battery pack of the two or more battery packs as a priority battery pack;
   charging and discharging the priority battery pack and maintaining one or more other battery packs in an idle state;
   ascertaining if the priority battery pack satisfies one or more conditions; and
   in response to the priority battery pack satisfying the one or more conditions, setting one of the one or more other battery packs to be the priority battery pack and maintaining the remaining battery packs in an idle state;
   wherein the priority battery pack is prioritized in terms of charging and discharging.

13. The information handling device of claim 12, wherein the one or more conditions comprise charging/discharging for a predetermined number of cycles.

14. The information handling device of claim 12, wherein the one or more conditions comprise a predetermined time as a priority battery pack.

15. The information handling device of claim 12, wherein the one or more conditions comprise a remaining capacity of a currently prioritized battery pack.

16. The information handling device of claim 12, wherein the one or more conditions comprise a capacity of a currently prioritized battery pack.

17. The information handling device of claim 12, wherein the acts further comprise:
   during the act of charging and discharging the priority battery pack and maintaining one or more other battery packs in an idle state, intermittently cycling one of the one or more other battery packs.

18. The information handling device of claim 17, wherein intermittently using one of the one or more other battery packs comprises charging and discharging one of the one or more other battery packs about once per twenty charge/discharge cycles.

19. The information handling device of claim 12, wherein the acts further comprise determining that one of the two or more battery packs has been newly installed.

20. The information handling device of claim 19, wherein the acts further comprise further comprising setting the newly installed battery pack to be the priority battery pack for a predetermined period.

21. The information handling device of claim 20, wherein the predetermined period comprises a predetermined number of cycles, and further wherein the predetermined number of cycles is dynamically modified to level the newly installed battery pack with one or more other battery packs.

22. A program product, comprising:
   a storage medium having computer program code embodied therewith, the computer program code comprising:
   computer program code that sets a battery pack, in an information handling device having two or more battery packs, as a priority battery pack;
   computer program code that charges and discharges the priority battery pack and maintain one or more other battery packs in an idle state;
   computer program code that ascertains if the priority battery pack satisfies one or more conditions; and
   computer program code that, in response to the priority battery pack satisfying the one or more conditions, sets one of the one or more other battery packs to be the priority battery pack and maintain the remaining battery packs in an idle state;
   wherein the priority battery pack is prioritized in terms of charging and discharging.

* * * * *